United States Patent
Haynes et al.

(10) Patent No.: US 6,834,305 B1
(45) Date of Patent: Dec. 21, 2004

(54) SYSTEM AND METHOD FOR AUTOMATICALLY CONNECTING LOCAL AND REMOTE DATA PROCESSING SYSTEMS

(75) Inventors: Thomas Richard Haynes, Apex, NC (US); Dominic Tracy Pruitt, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,724

(22) Filed: Nov. 16, 1999

(51) Int. Cl.[7] .................................................. H04L 1/00
(52) U.S. Cl. ...................... 709/227; 709/200; 709/217; 709/219
(58) Field of Search ................................. 709/200, 201, 709/203, 217, 219, 227

(56) References Cited

U.S. PATENT DOCUMENTS

| | | | |
|---|---|---|---|
| 4,941,123 A | * 7/1990 | Thompson | 709/217 |
| 5,065,392 A | 11/1991 | Sibbitt et al. | 370/58.2 |
| 5,357,503 A | 10/1994 | Montarges et al. | 370/58.3 |
| 5,513,171 A | 4/1996 | Ludwiczak et al. | 370/13 |
| 5,699,511 A | * 12/1997 | Porcaro et al. | 714/55 |
| 5,764,645 A | 6/1998 | Bernet et al. | 370/466 |
| 5,867,666 A | 2/1999 | Harvey | 395/200.68 |
| 5,881,231 A | * 3/1999 | Takagi et al. | 709/212 |
| 5,896,444 A | * 4/1999 | Perlman et al. | 379/93.35 |
| 6,208,622 B1 | * 3/2001 | Makrucki | 370/252 |
| 6,259,442 B1 | * 7/2001 | Britt et al. | 345/721 |

OTHER PUBLICATIONS

Computer Networks 31 (1999) 1709–1723, "Managing TCP connections under persistent HTTP," E. Cohen, H. Kaplan, and J. Oldham.

* cited by examiner

Primary Examiner—Ario Etienne
Assistant Examiner—April Baugh
(74) Attorney, Agent, or Firm—Dillon and Yudell

(57) ABSTRACT

A method, system, and program product automatically determines that a communication request addressed to a remote data processing system may be expected and, in response, automatically establishes a connection to the remote data processing system, thereby causing the time interval for establishing the connection to elapse prior to transmission or reception of the communication request. Thereafter, a communication request is forwarded to the remote data processing system via the connection.

18 Claims, 7 Drawing Sheets

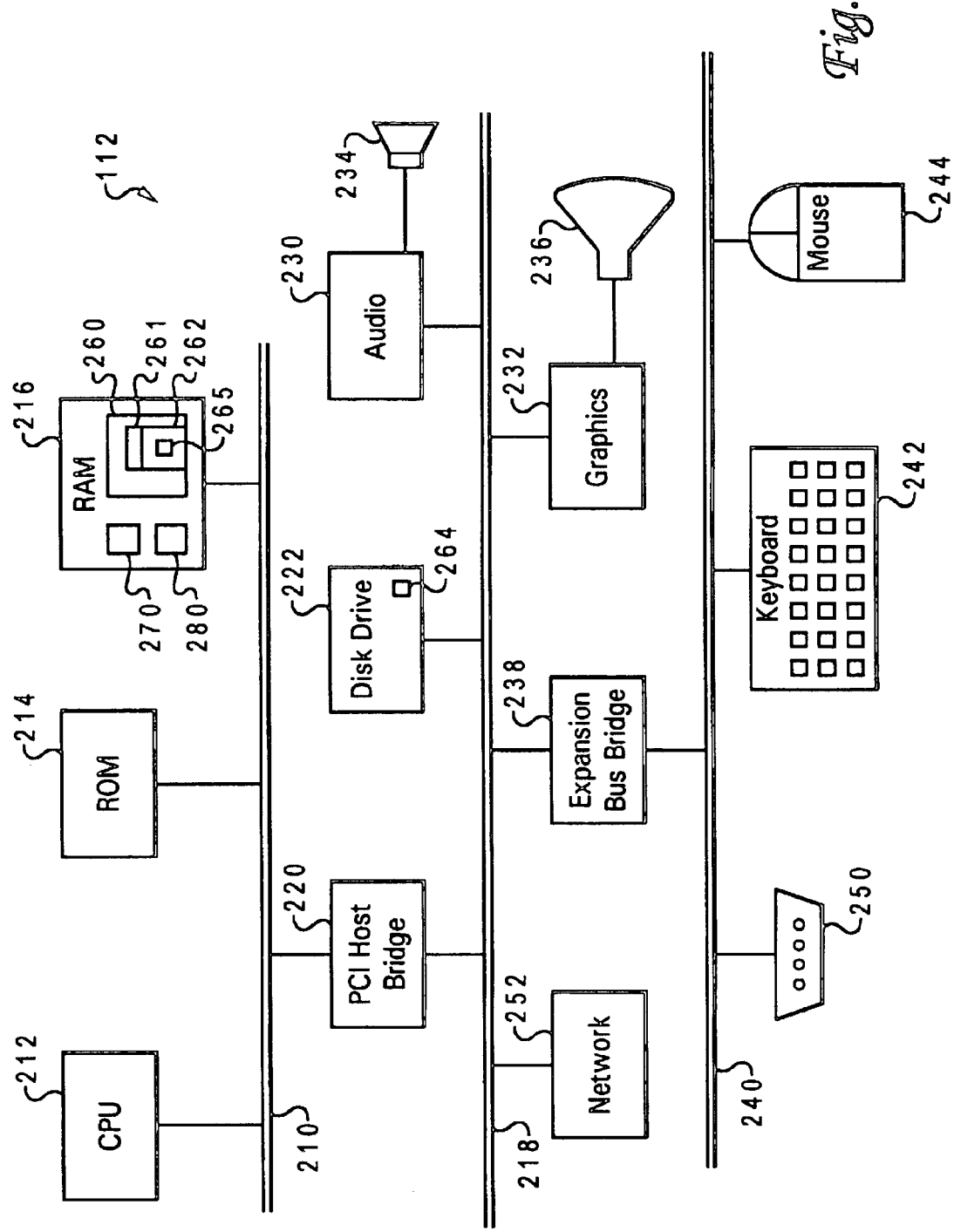

CONNECTION SCHEDULE 264

| | Mon | Tue | Wed | Thu | Fri | Sat | Sun |
|---|---|---|---|---|---|---|---|
| 7:00 | | | | | | | |
| 8:00 | I | I | I | I | I | | |
| 9:00 | | | | | | | |
| 10:00 | | | | | | I | |
| 11:00 | | | | | | | |
| 12:00 | | | | | | T | |
| 13:00 | I | I | I | I | I | | |
| 14:00 | | | | | | | |
| 15:00 | | | | | | | |
| 16:00 | | | | | | | |
| 17:00 | | | | | T | | |
| 18:00 | T | T | T | T | | | |
| 19:00 | | | | | | | |

SYSTEM AND METHOD FOR AUTOMATICALLY CONNECTING LOCAL AND REMOTE DATA PROCESSING SYSTEMS

BACKGROUND OF THE INVENTION

1. Technical Field

The present invention relates in general to data processing and in particular to networked data processing systems. Still more particularly, the present invention relates to systems and methods for automatically connecting to a remote data processing system in advance of anticipated utilization of the remote data processing system.

2. Description of the Related Art

In the field of networked data processing systems, two major classes of networks are recognized, local area networks (LANs) and wide area networks (WANs), and the data processing systems that belong to a LAN or WAN are known as stations. The stations of a LAN are all located within a limited geographical area, such as within a building, and those stations are usually linked together by cables that are utilized exclusively for carrying information between the connected systems. By contrast, however, the stations of a WAN may be widely separated geographically, being located in a different buildings, cities, or nations, for instance. Further, in a WAN information is often transmitted between stations via telephone lines, either through leased lines or through public, switched telephone lines. If a continuous connection between local and remote WAN stations is not required, switched lines are typically utilized since they are less expensive than leased lines.

If a switched line is utilized as a WAN's communications medium, once the connection is established the switched line can convey information between local and remote stations with great rapidity. One disadvantage associated with utilizing a switched line, however, is the delay associated with establishing the dial-up connection to the remote data processing system (i.e., the connecting delay). In WANs utilizing conventional dial-up technology, such delays impede personal productivity and can cause a request for data from a remote station (i.e., a communication request) to fail. For instance, in a LAN with a server that links the LAN to an Internet service provider (ISP) over a switched line (thereby creating a WAN including the LAN and the ISP), the connection to the ISP ordinarily is maintained while remote communications are active and terminated after a certain period of inactivity. Consequently, the next communication request following a termination cannot be forwarded by the server until a new connection with the ISP has been established, and the connecting delay will be apparent to the station that initiated the communication request. Furthermore, as described below, when the communication request employs an acknowledgment (ACK)-based communications protocol, such as TCP/IP, the connecting delay is likely to cause the initiating station to determine that the communication request failed.

The present invention recognizes that the noticeable delays and communications failures associated with utilizing conventional WAN dial-up technology can effectively be reduced or eliminated, and productivity can be increased, by determining in advance when a connection will be required and then automatically establishing the connection before any communication requests are initiated.

SUMMARY OF THE INVENTION

To address the shortcomings of conventional WAN dial-up technology, the present invention provides a method, system, and program product that automatically determines that a communication request addressed to a remote data processing system may be expected and, in response, automatically establishes a connection to the remote data processing system, thereby causing the time interval for establishing the connection to elapse prior to transmission or reception of the communication request. Thereafter, a communication request is forwarded to the remote data processing system via the connection.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a block diagram of an illustrative embodiment of a data processing system with facilities for automatically connecting to a remote data processing system according to the present invention;

DETAILED DESCRIPTION OF ILLUSTRATIVE EMBODIMENT

Figure 1:
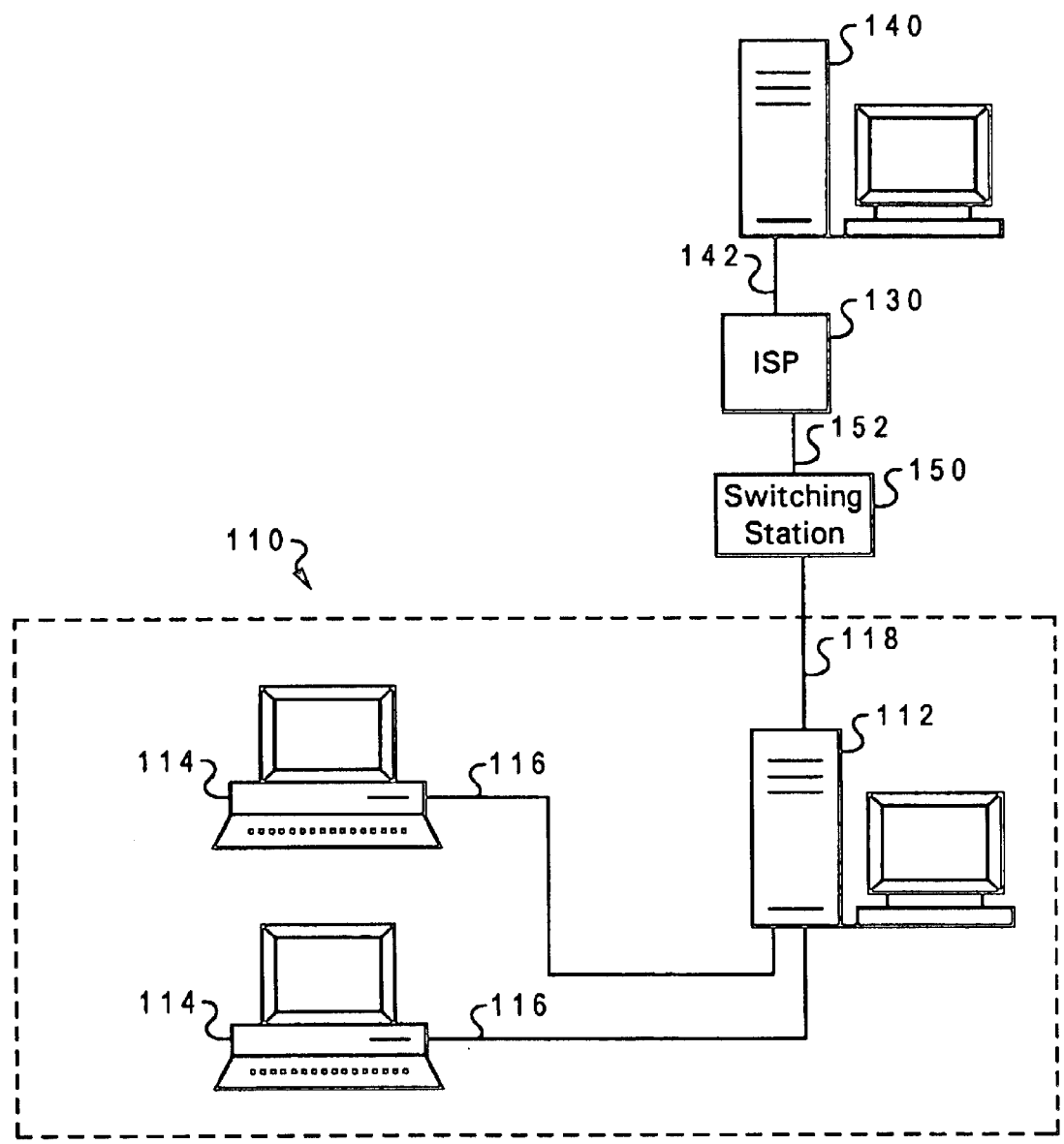
FIG. 1 illustrates an exemplary WAN including facilities for automatically connecting local and remote data processing systems in accordance with the present invention.

With reference now to the figures, and in particular with reference to FIG. 1, there is depicted equipment which cooperates, when connected, to create an exemplary WAN including facilities, in accordance with the present invention, for automatically connecting a local data processing system to a remote data processing system. The illustrated WAN includes a LAN 110 with multiple stations. In particular, the LAN includes a server 112 that is connected to two clients 114 via a communications medium 116 (such as twisted-pair cables, coaxial cables, or microwave links) and to a switched local telephone line 118. Also included in the WAN is a remote data processing system, which serves as a gateway or bridge 130 for linking server 112 with a second remote data processing system 140 via a remote telephone line 142. Server 112 communicates with bridge 130 via one or more intermediate switching stations 150 and telephone line 152. In the illustrative embodiment, bridge 130 is an ISP, communications to and from remote data processing system 140 utilize the TCP/IP communications protocol, and remote data processing system 140 is a Web server (i.e., a data processing system that is connected to the Internet and that provides Web pages or other types of information to other data processing systems upon request).

Figure 2A:
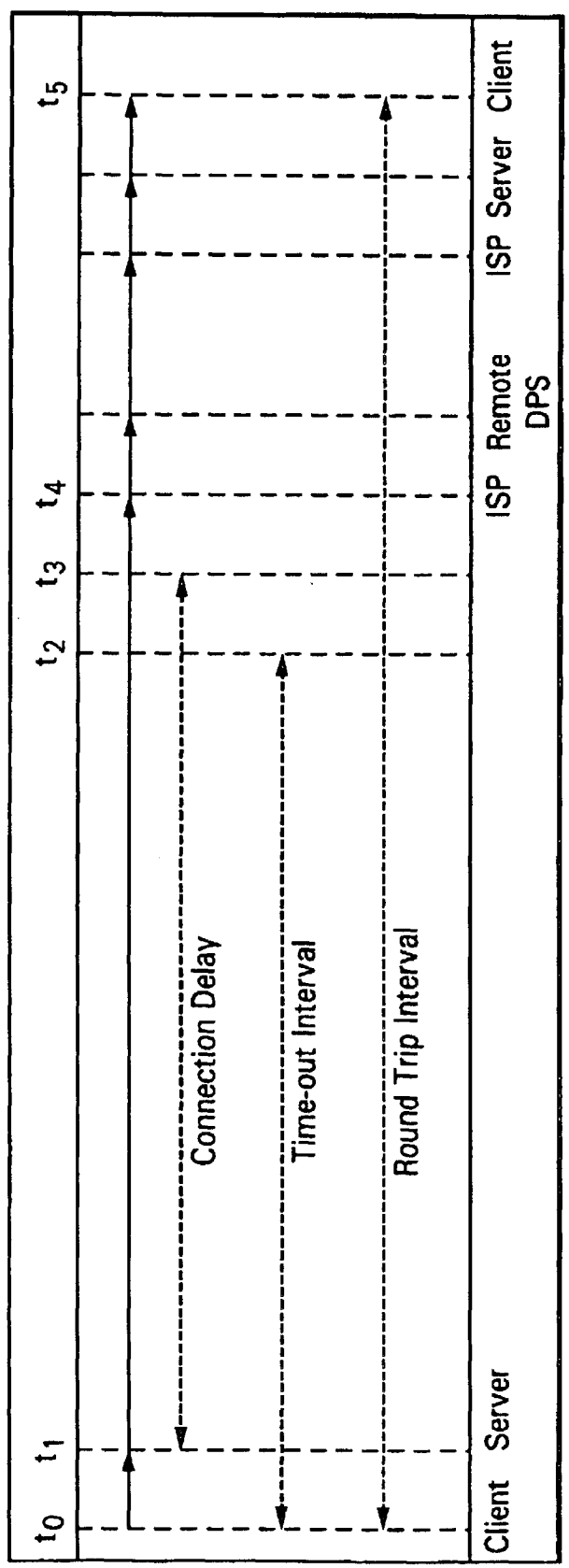
FIG. 2A depicts a sequence of events associated with transmitting a communication request in accordance with conventional connection techniques.

Referring now to FIG. 2A, there is illustrated a time line of an exemplary connection sequence within the context of a LAN with a server utilizing conventional dial-up connection facilities. Specifically, the events within the connection sequence track a TCP/IP message, from a LAN client, that includes a request to download a Web page from a remote Web server.

At time t0 the client sends the message and starts an ACK timer with a limit that equals the maximum amount of time that would ordinarily be required for the message to reach its destination and an acknowledging reply from the remote data processing system to reach the client (i.e., for the message to make a round trip). The ACK timer thus establishes a time-out interval which, in the current example, will terminate at time t2.

At time t1 the server receives the message. If a connection then already existed, the server would forward the message to the ISP without delay. In the current example, however, no connection yet exists, so the server initiates a connection to the ISP by dialing the ISP's phone number. Once the ISP answers the call, the server and the ISP perform the "handshake" (i.e., exchange of information) necessary to establish the parameters of the connection, and, upon completion of the handshake at time t3, the server forwards the message to the ISP. Since the server initiated the connection only after receiving an outbound message, the entire time spent establishing the connection (i.e., the connection interval) constitutes a connection delay, in that forwarding of the message by the server is delayed, and thus the round trip interval is extended, by the connection interval.

However, as often happens in conventional systems, before the client receives an ACK, the client's ACK timer times-out, as shown at time t2. Since no ACK has been received even though the time-out interval has expired, the client determines that the message has likely been lost. The client then proceeds accordingly, for instance by retransmitting the message or displaying an error message indicating that a connection to the addressed remote data processing system could not be established.

As illustrated, the ISP nevertheless subsequently forwards the message to the remote data processing system at time t4, and a reply containing an ACK for the message is received by the client at time t5. However, since the round trip interval has exceeded the time-out interval, the client does not associate the reply with the original message and discards the reply.

The connection interval is typically significantly longer than a normal round trip interval. For example, it is not unusual for twenty seconds or more to pass while a dial-up connection is being established. When a connection already exists, however, a message might be transmitted by a client, forwarded to a remote data processing system, and an ACK received by the client in five seconds or less. The present invention provides a communications manager that addresses the problems associated with connection delay by monitoring network status and/or by consulting a connection schedule to anticipate outbound messages and then connecting to a remote data processing system before actual messages are initiated.

Figure 2B:
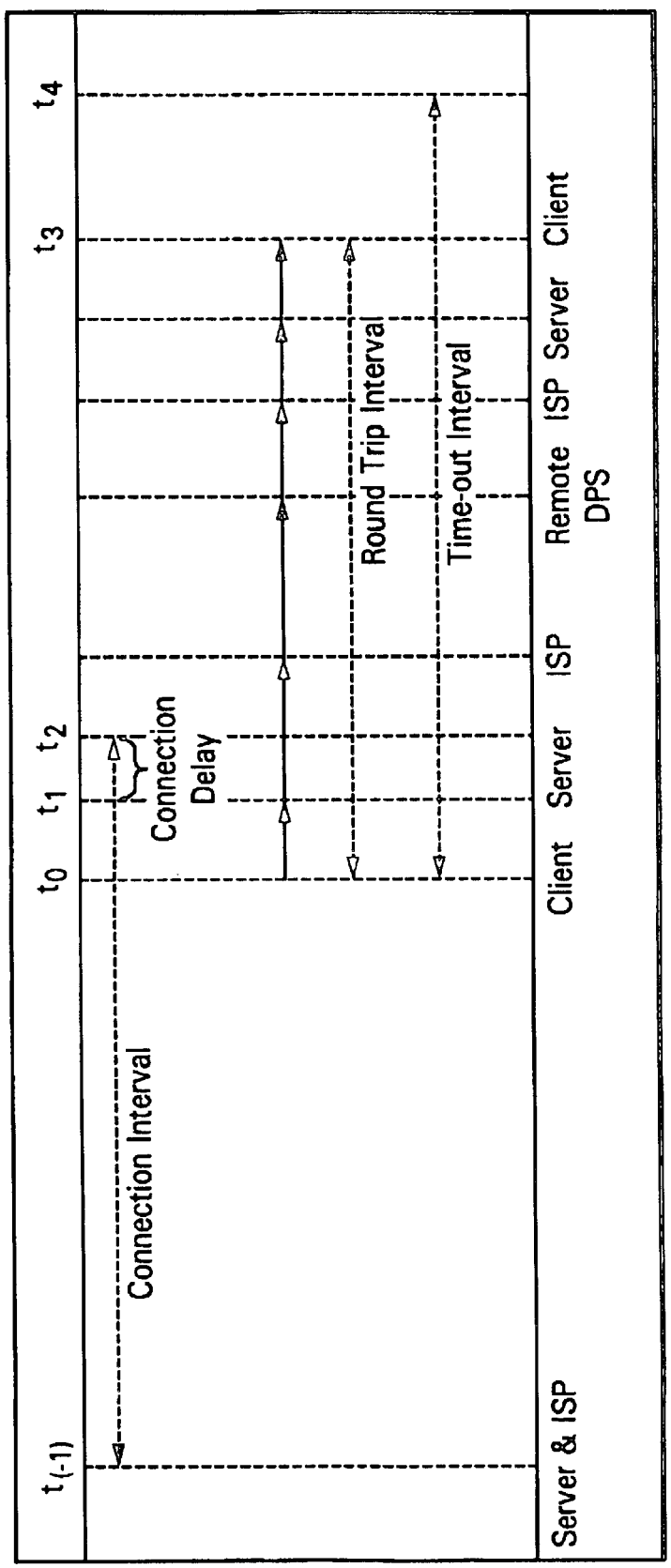
FIG. 2B illustrates a sequence of events associated with transmitting a communication request in accordance with illustrative connection techniques utilizing the present invention.

With reference now to FIG. 2B, there is illustrated a time line of an exemplary connection sequence in accordance with the present invention. The sequence begins at time t(−1) when a request predictor in the server anticipates that any station in the LAN (including the server), or any of a subset of LAN stations, is likely to transmit a communication request. That prediction can be made by reference to a connection schedule and/or it can be made in response to other stimulus, such as upon detecting that a client has been activated or has requested an IP address from the server and/or upon detecting operator input from the server's keyboard or mouse. In response to the prediction, also at time t(−1), a connection initiator automatically causes the server to begin establishing a dial-up connection to the ISP, even though the server has not yet received a communication request.

At time t0 the client transmits a message, which is received by the server at time t1, as in the previous example. Preferably, the connection will have been completed by the time the message reaches the server, in which case server will immediately forward the message to the ISP. However, as illustrated, even if the connection is not yet complete, at least the part of the connection interval will have already passed. Accordingly, only the tail end of the connection interval will constitute a connection delay (i.e., will constitute time during which the server must wait before forwarding the message to the ISP). In the current example, the connection delay extends from t1 to t2.

As shown, once the connection is complete, the server forwards the message to the remote data processing system via the ISP. At time t3 the client receives a corresponding ACK. Since only a small part of the connection interval affects the round trip interval, the ACK is received before t4, the time at which the time-out interval would have expired. Consequently, the client associates the ACK with the transmitted message and a time-out error is avoided.

Thus, when used to manage ACK-based communications, the present invention reduces or eliminates the time-out errors that result from the connection delays that conventional switched-line WANs experience. The present invention accomplishes that objective by eliminating the connection delay or reducing the connection delay enough to prevent the round trip interval from exceeding the time-out interval. In addition, the present invention enhances productivity in other environments by establishing dial-up connections in advance of anticipated message transmissions, thereby allowing users to communicate with no apparent connection delay.

Referring now to FIG. 3, there is depicted a block diagram of server 112 of the illustrative embodiment. As shown, server 112 includes a system bus 210 that is connected to a central processing unit (CPU) 212 and to memory, including read only memory (ROM) 214 and random access memory (RAM) 216. System bus 210 coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keyboard 242 and a mouse 244 for receiving operator input.

Also included in server 112 are data ports for communicating with external equipment, such as other data processing systems. Those data ports include, without limitation, a serial port 250 attached to ISA bus 240 for linking server 112 to remote data processing systems (such as bridge 130) via a modem (not illustrated) and a communications adapter 252 attached to PCI bus 218 for linking server 112 to other stations of a LAN (such as clients 114). In the illustrative embodiment, the architecture of clients 114 is similar to that of server 112. However, each client 114 communicates with remote data processing systems through server 112 via an included communications adapter 252, and each client 114 may therefore omit serial port 250.

Server 112 also contains programs that are stored on the data storage devices and loaded into RAM 216 and then into CPU 212 for execution. Among those programs is a communications program, such as communications manager 260, that manages the exchange of information between LAN 110 and remote data processing systems (such as bridge 130 and remote data processing system 140). Included in communications manager 260 is a connection initiator 261 for establishing dial-up connections to remote data processing systems (such as bridge 130). Communications manager 260 also includes Internet sharing software 262 that enables multiple LAN stations to access the Internet via a single connection. In the illustrative embodiment, server 112 also includes a connection schedule 264, which preferably is stored in disk drive 222, and Internet sharing software 262 includes a request predictor 265 that utilizes connection schedule 264 to trigger connection initiator 261 in advance of anticipated communication requests.

Connection schedule 264 is maintained by a schedule editor and/or an automatic schedule modifier, each of which is preferably also included in Internet sharing software 262. Server 112 also includes a Web browser 270 and an E-mail client 280 that allow an operator of server 112 or client 114 to retrieve and view information from the Internet and send and receive E-mail via the Internet, respectively.

Figures 4, 5:
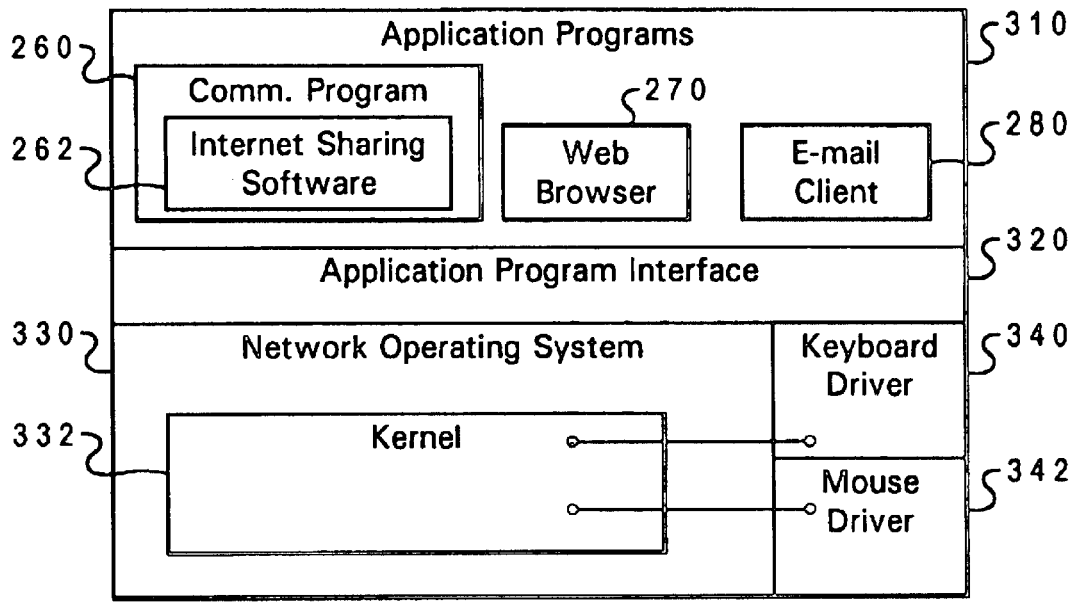
FIG. 4 is a layer diagram of the programs in the data processing system of FIG. 3 that cooperate to automatically connect to a remote data processing system according to the present invention.
FIG. 5 depicts an exemplary schedule for automatically connecting to a remote data processing system in accordance with an illustrative embodiment of the present invention.

With reference now to FIG. 4, there is depicted a layer diagram of the software in server 112 that cooperates to provide the functionality of the present invention according to the illustrative embodiment. At the highest level of the diagram are the application programs 310, including communications manager 260, Web browser 270, and E-mail client 280. At the intermediate level is an application program interface (API) 320, through which application programs 310 request services from the operating system 330. Operating system 330, which occupies the lowest level of the diagram, is a network operating system. As such, in addition to managing the operations of server 112 (by performing duties such as resource allocation, task management, and error detection), operating system 330 also provides tools for managing communications within LAN 110 and between LAN stations and remote data processing systems. Included in operating system 330 is a kernel 332 that manages the memory, files, and peripheral devices of server 112. The lowest level also includes device drivers, such as a keyboard driver 340 and a mouse driver 342, that kernel 332 utilizes to manage input from and output to peripheral devices.

With reference now to FIG. 5, there is depicted an exemplary connection schedule 264 specifying times at which a dial-up connection should be established if one is not already in place (i.e., commencement times). These commencement times may be defined and modified by an operator, they may be defined and modified automatically based on historical patterns of communication with remote data processing systems, such as bridge 130, or they may be defined and modified through a combination of manual and automatic procedures.

For instance, for a LAN in an office with regular 9:00 a.m. to 5:00 p.m. hours of operation, a network administrator might utilize a connection schedule editor to define commencement times of 8:55 a.m. for every Monday through Friday. Alternatively or conjunctively, automatic schedule modification might be enabled on server 112, such that a commencement time of 8:25 a.m. for every Monday, for example, will automatically be replaced with a commencement time of 9:25 a.m. if server 112 determines that Monday's first daily outbound message usually or always occurs after 9:30 a.m. In addition, connection schedule 264 can include termination times, such that, for instance, if server 112 and bridge 130 are connected but not actively communicating when a termination time is reached, server 112 will terminate the connection.

In the illustrative embodiment, connection schedule 264 includes commencement times at 8:00 a.m. and 1:00 p.m. on Monday through Friday and at 10:00 a.m. on Saturday. Connection schedule 264 also contains termination times at 6:00 p.m. on Monday through Friday and at noon on Saturday.

Figure 6A:
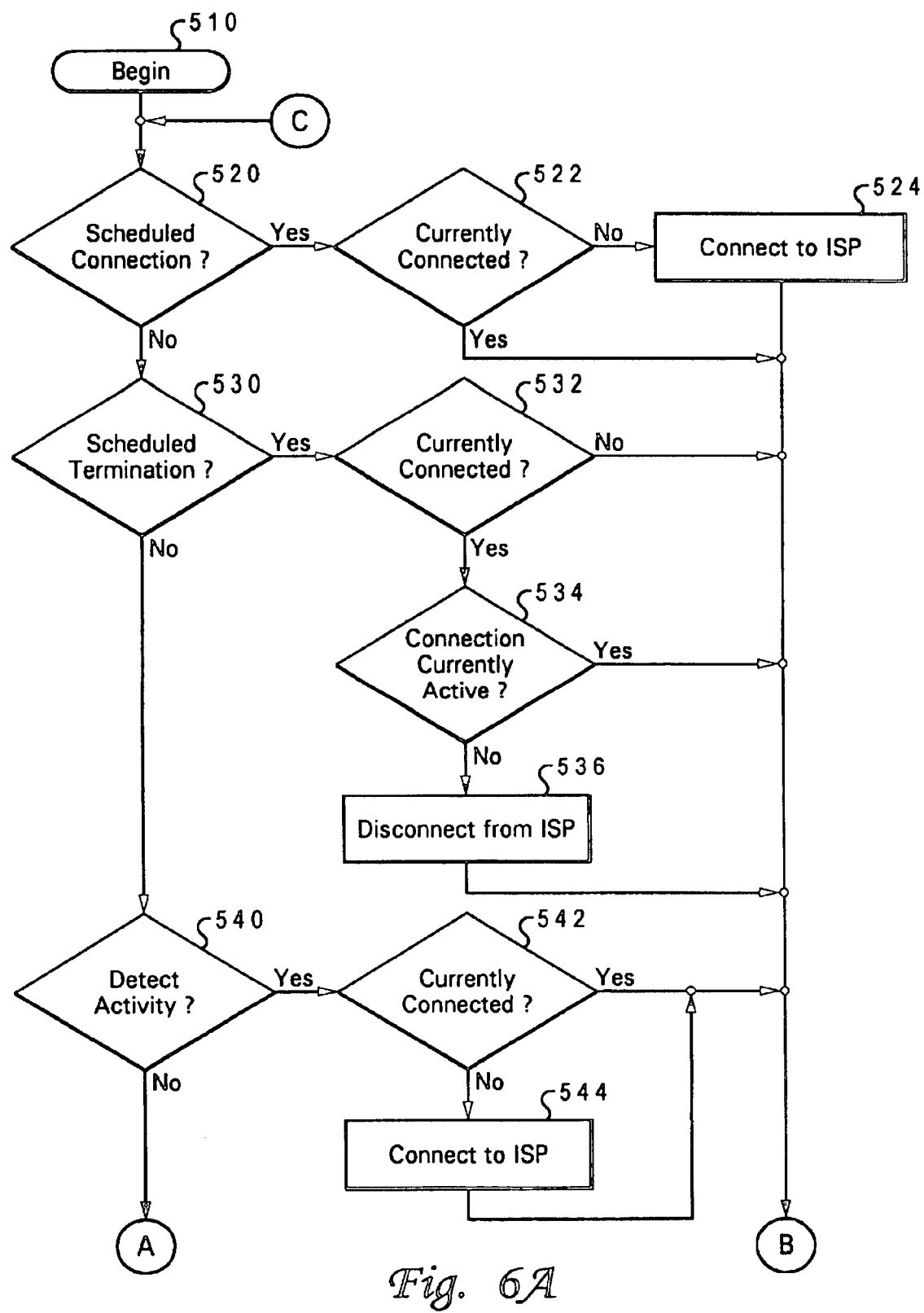
FIGS. 6A and 6B illustrate a logical flowchart of an exemplary process for automatically connecting to a remote data processing system in accordance with the present invention.
Figure 6B:
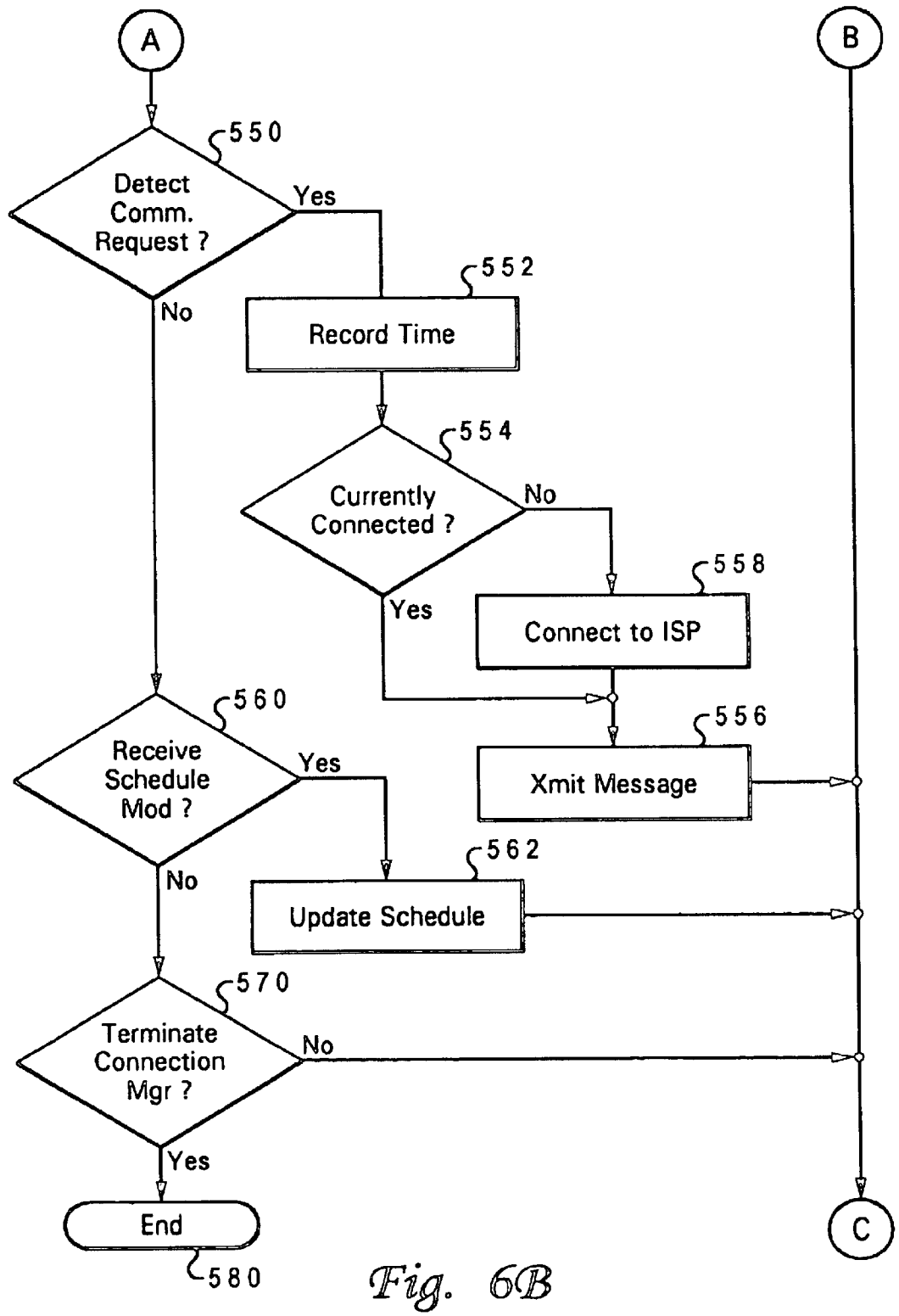

With reference now to FIGS. 6A and 6B, two flowcharts are shown that together depict an exemplary process for automatically connecting to a remote data processing system in accordance with the present invention. For illustrative purposes, the process shown in FIGS. 6A and 6B will be described in terms of software executing on server 112, including communications manager 260 and Internet sharing software 262. In addition, certain operations will be performed by request predictor 265, an activity monitor, a schedule editor, and an automatic schedule modifier, each of which is depicted as a component of Internet sharing software 262. However, as will be apparent to those of ordinary skill in the art, some or all of those operations could as well be implemented in components that are separate from Internet sharing software 262. Furthermore, the described operations can be implemented by software, hardware, firmware, or a combination of these.

The process depicted in FIG. 6A begins at block 510 with server 112 executing communications manager 260 and Internet sharing software 262. Then, beginning at block 520, the process enters an evaluation loop, in which Internet sharing software 262 assesses various conditions to determine whether a connection between server 112 and bridge 130 should be established or terminated. As illustrated at block 520, within the loop request predictor 265 first determines, by reference to connection schedule 264, whether a commencement time has been reached. If so, the process passes to block 522, which depicts Internet sharing software 262 determining whether server 112 is already connected to bridge 130. If server 112 and bridge 130 are not connected, the process passes to block 524, which shows connection initiator 261 establishing such a connection. However, if it is determined at block 522 that server 112 and bridge 130 are already connected, the process does not enter block 524 but simply returns to block 520 (via page connectors B and C) to resume the evaluation loop.

Referring again to block 520, if request predictor 265 determines that no commencement time has been reached, the process passes to block 530, which depicts request predictor 265 determining whether a termination time has been reached. If so, Internet sharing software 262 determines whether a connection currently exists, as shown at block 532. If server 112 and bridge 130 are not connected, the process then simply returns to block 520 (via page connectors B and C) to resume the evaluation loop. However, as shown at block 534, if server 112 and bridge 130 are connected, Internet sharing software 262 then determines whether the connection is currently active (for instance, by determining whether any messages have been sent via the connection within the five minutes immediately preceding the determination). If the connection is not active, the process passes to block 536, which shows server 112 disconnecting from bridge 130, and then passes through page connectors B and C to block 520 to resume the evaluation loop. However, if Internet sharing software 262 determines at block 534 that the connection is still active, the process returns to block 520 (via page connectors B and C) without terminating the connection.

With reference again to block 530, if a termination time has not been reached, the process passes to block 540, which depicts the activity monitor determining whether any of the LAN stations are being used in a manner that suggests that an outbound communication request is likely to be forthcoming. Stimuli which could cause the activity monitor to anticipate an outbound message include, without limitation, utilization of server 112 by one of clients 114 or operator utilization of an input device connected to server 112 or one of clients 114. If such activity is detected, the process automatically passes to block 542, which depicts Internet sharing software 262 determining whether server 112 is already connected to bridge 130. If server 112 and bridge 130 are not connected, the process passes to block 544, which shows connection initiator 261 establishing such a connection. However, if it is determined at block 542 that server 112 and bridge 130 are already connected, the process bypasses block 544 and returns to block 520 (via page connector C) to resume the evaluation loop.

Referring again to block 540, if no significant activity is detected, the process passes through page connector A to block 550, which depicts Internet sharing software 262 determining whether a communication request has been received, either from server 112 or from one of clients 114. If a communication request has been received, Internet sharing software 262 records the time of that communication request for the future reference of the automatic schedule modifier, as shown at block 552. Then, as illustrated at block 554, Internet sharing software 262 determines whether server 112 and bridge 130 are currently connected. If a connection already exists, Internet sharing software 262 then simply transmits the received communication request via the existing connection, as shown at block 556. However, if there is no existing connection, connection initiator 261 establishes a connection to bridge 130, as illustrated at block 558, and Internet sharing software 262 then utilizes communications manager 260 to forward the received communication request to bridge 130, as shown at block 556. Regardless of the outcome of the determination depicted at block 554, once communications manager 260 has forwarded the communication request to bridge 130, the process returns to block 520 (via page connectors B and C) to resume the evaluation loop.

With reference again to block 550, if no outbound message has been received, the process passes to block 560, which shows Internet sharing software 262 determining whether a modification of connection schedule 264 has been requested, for instance in response to a change entered by a network administrator via the schedule editor or in response to a change entered by the automatic schedule modifier in accordance with historical connection data. If schedule modification has been requested, the process proceeds to block 562, which shows the schedule editor or the automatic schedule modifier updating the connection schedule. The process then returns to block 520 via page connector C to resume the evaluation loop.

Referring again to block 560, if schedule modification has not been requested, the process passes to block 570, which depicts Internet sharing software 262 determining whether server 112 has received a request to disable the facilities for automatic connecting server 112 and bridge 130, for instance from a network administrator. If such a request has not been received, the process returns to block 520 (via page connector C)to resume the evaluation loop. Otherwise, the process terminates at block 580.

As has been described, the present invention increases productivity and reduces or eliminates the time-out errors that result from the connection delays that conventional switched-line WANs experience by establishing dial-up connections in advance of anticipated message transmissions. While the invention has been particularly shown and described with reference to an illustrative embodiment, it will be understood by those skilled in the art that various changes in form and detail may be made therein without departing from the spirit and scope of the invention.

For example, it should be understood that the present invention is not limited to Internet communications, but could as well benefit communications within other environments, including different public or private WANs using communications protocols other than TCP/IP. Further, although the illustrative embodiment has been described in the context of a WAN utilizing conventional telephone lines, the present invention would provide equal or greater benefits when utilized within WANs having greater latency, such as WANs that include cellular and/or satellite links.

Also, although the present invention has been described in the context of a server receiving a message from a client, the benefits of the present invention are also realized when the message originates from the server. The benefits are so realized because, in conventional systems, server-originated messages suffer from the same connection delays and consequent time-out errors as client-originated messages. Also, although the LAN server of the illustrative embodiment has been portrayed as a personal computer, the present invention could as well be implemented on other types of servers, including, without limitation, mainframe computers and mini-computers.

In addition, although the present invention has been described in terms of software and data executing on and stored in the LAN server, the connection schedule and/or one or more subsets of the depicted operations could be stored in and/or performed by one or more data processing systems other than the LAN server. For example, the connection schedule could be stored elsewhere (such as in other LAN stations) and retrieved by the server when needed, or a station other than the server could determine when the server should initiate a dial-up connection.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for automatically connecting a local data processing system to a remote data processing system disconnected from the local data processing system in advance of anticipated communication with the remote data processing system, said method comprising:
   automatically determineing that the local data processing system is likely to transmit a communication request that utilizes an acknowledgement (ACK)-based protocol to the remote data processing system that is disconnected from the local data process system,
   wherein:
      said determination is made in response to a stimulus other than attempted transmission of said communication request; and
      said ACK-based protocol causes a time-out error to be produced if an ACK for said communication request is not received by said local data processing system before a response time expires;
   a connection time required to connect the local data processing system to the remote data processing system is greater than the response time;
   in response to said determination automatically completing a connection to said remote data processing system that is disconnected from the local data processing system prior to reception of said communication request;
   thereafter, transmitting said communication request to said remote data processing system via said connection; and
   thereafter, receiving said ACK before said response time expires.

2. A method according to claim 1, wherein:
   in said step of automatically completing a connection, said remote data processing system is a first remote data processing system; and
   in said step of automatically determining, said remote data processing system is a second remote data processing system.

3. A method according to claim 1, wherein:
   said method further comprises detecting user activity; and
   said stimulus comprises said detected user activity.

4. A method according to claim 1, wherein:
   said method further comprises receiving a connection schedule containing one or more connection commencement times; and
   said stimulus comprises determining that at least one of said one or more connection commencement times has been reached.

5. A method according to claim 4, wherein said step of receiving said connection schedule comprises accepting operator input defining said one or more connection commencement times.

6. A method according to claim 4, wherein said step of receiving said connection schedule comprises:
   automatically determining historical commencement times of two or more of said communication requests; and
   automatically defining said one or more connection commencement times to include anticipated commencement times that correspond to said historical commencement times.

7. A local data processing system with facilities for automatically connecting to a remote data processing system disconnected from the server local data processing system in advance of anticipated communication with the remote data processing system, said local data processing system comprising:
   a processor, a memory, and a data port for connecting to a remote data processing system;
   a request predictor that automatically determines that said local data processing system is likely to transmit a communication request that utilizes an acknowledgement (ACK)-based protocol to said remote data processing system that is disconnected from the local data processing system, wherein:
      said determination occurs in response to a stimulus other than attempted transmission of said communication request; and
      said ACK-based protocol causes a time-out error to be produced if an ACK for said communication request is not received by said local data processing system before a response time expires;
   a connection time required to connect the local data processing system to the remote data processing system is greater than the response time;
   a connection initiator that responds to said determination by automatically completing a connection to said remote data processing system that is disconnected from the local data processing system prior to any attempted transmission of said communication request; and
   a communication manager that transmits said communication request to said remote data processing system via said connection and receives said ACK before said response time expires.

8. A local data processing system according to claim 7, wherein:
   said connection initiator automatically completes a connection to a first remote data processing system; and
   said communication request is addressed to a second remote data processing system.

9. A local data processing system according to claim 7, wherein:
   said local data processing system further comprises an activity monitor for detecting user activity; and
   said stimulus comprises said detected user activity.

10. A local data processing system according to claim 7 further comprising:
   a connection schedule containing one or more connection commencement times; and
   wherein said stimulus comprises determining that at least one of said one or more connection commencement times has been reached.

11. A local data processing system according to claim 10 further comprising a schedule editor for accepting operator input defining said one or more connection commencement times.

12. A local data processing system according to claim 10 further comprising an automatic schedule modifier that tracks historical commencement times of two or more of said communication requests and automatically defines said one or more connection commencement times to include anticipated commencement times that correspond to said historical commencement times.

13. A program product for automatically connecting a local data processing system to a remote data processing system disconnected from the local data processing system in advance of anticipated communication with the remote data processing system, said program product comprising:

a request predictor that automatically determines that said local data processing system is likely to transmit a communication request that utilizes an acknowledgement (ACK)-based protocol to said remote data processing system that is disconnected from the local data processing system, wherein:
  said determination is made in response to a stimulus other than attempted transmission of said communication request; and
  said ACK-based protocol causes a time-out error to be produced if an ACK for said communication request is not received by said local data processing system before a response time expires;
a connection time required to connect the local data processing system to the remote data processing system is greater than the response time;
a connection initiator that responds to said determination by automatically completing a connection between to said remote data processing system that is disconnected from the server prior to any attempted transmission of said communication request;
a communication manager that transmits said communication request to said remote data processing system via said connection and receives said ACK before said response time expires; and
a computer usable medium encoding said request predictor, said connection initiator, and said communication manager.

14. A program product according to claim 13, wherein:
  said connection initiator automatically completes a connection to a first remote data processing system; and
  said communication request is addressed to a second remote data processing system.

15. A program product according to claim 13, wherein:
  said computer usable medium also encodes an activity monitor for detecting user activity; and
  said stimulus comprises said detected user activity.

16. A program product according to claim 13, wherein said stimulus comprises determining, by reference to a connection schedule containing one or more connection commencement times, that at least one of said one or more connection commencement times has been reached.

17. A program product according to claim 16 further comprising a schedule editor, encoded on said computer usable medium, for accepting operator input defining said one or more connection commencement times.

18. A program product according to claim 16 further comprising an automatically schedule modifier, encoded on said computer usable medium, that tracks historical commencement times of two or more of said communication requests and automatically defines said one or more connection commencement times to include anticipated commencement times that correspond to said historical commencement times.

* * * * *